United States Patent
Hashiba

(10) Patent No.: US 8,101,112 B2
(45) Date of Patent: Jan. 24, 2012

(54) PROCESS FOR INJECTION MOLDING RESIN WITH PLANT MATERIAL

(75) Inventor: Masanori Hashiba, Mizunami (JP)

(73) Assignee: Toyota Boshoku Kabushiki Kaisha, Aichi-Ken (JP)

(*) Notice: Subject to any disclaimer, the term of this patent is extended or adjusted under 35 U.S.C. 154(b) by 593 days.

(21) Appl. No.: 12/301,632

(22) PCT Filed: Jun. 7, 2007

(86) PCT No.: PCT/JP2007/061568
§ 371 (c)(1),
(2), (4) Date: Nov. 20, 2008

(87) PCT Pub. No.: WO2007/142305
PCT Pub. Date: Dec. 13, 2007

(65) Prior Publication Data
US 2009/0197079 A1 Aug. 6, 2009

(30) Foreign Application Priority Data
Jun. 9, 2006 (JP) ................................. 2006-160945

(51) Int. Cl.
B29C 45/00 (2006.01)
B29K 1/00 (2006.01)

(52) U.S. Cl. .............................. 264/328.14; 264/328.18

(58) Field of Classification Search ............. 264/328.14, 264/328.18
See application file for complete search history.

(56) References Cited

U.S. PATENT DOCUMENTS

| | | | |
|---|---|---|---|
| 5,705,216 A * | 1/1998 | Tyson | 426/478 |
| 6,406,530 B1 | 6/2002 | Bengs et al. | |
| 6,509,397 B1 | 1/2003 | Nägele et al. | |
| 7,906,569 B2 * | 3/2011 | Hashiba | 524/9 |
| 2006/0147695 A1 * | 7/2006 | Serizawa et al. | 428/297.4 |

FOREIGN PATENT DOCUMENTS

| | | |
|---|---|---|
| CN | 1316323 | 10/2001 |
| DE | 197 29 268 C2 | 7/2000 |
| EP | 1129140 A1 | 5/2000 |
| EP | 1589076 A1 | 10/2005 |
| JP | 2000-219812 A | 8/2000 |
| JP | 2002-226712 | 8/2002 |
| JP | 2002-226712 A | 8/2002 |
| JP | 2002-529567 A | 9/2002 |
| JP | 2003-119391 A | 4/2003 |
| JP | 2005-105245 A | 4/2005 |
| JP | 2005-288938 | 10/2005 |
| JP | 2006-117768 | 5/2006 |
| JP | 2006-272696 A | 10/2006 |
| WO | 00/27923 A1 | 5/2000 |
| WO | WO 01/21367 A1 | 3/2001 |
| WO | 2004/063282 | 7/2004 |
| WO | 2004/063282 A1 | 7/2004 |
| WO | WO 2004063282 A1 * | 7/2004 |

OTHER PUBLICATIONS

Carniglia, ed., Handbook of Industrial Refractories Technology, Noyes Publications 1992, Table II.1 (p. 26).*
Ververis et al., "Fiber Dimensions, Lignin and Cellulose Content of Various Plant Materials and their Suitability for Paper Production", Industrial Crops & Products 19 (2004) pp. 245-254.*
China Office action that issued with respect to patent family member Chinese Patent Application No. 200780021410.2, dated Feb. 28, 2011 along with an english translation thereof.
English language Abstract of JP 2002-226712 A.
English language Abstract of JP 2003-119391 A.
English language Abstract of JP 2006-272696 A.
English language Abstract of JP 2005-105245 A.
English language Abstract of JP 2000-219812 A.
Search Report of European Patent Application No. 07744896.7-2115/2028235.

* cited by examiner

Primary Examiner — Jill Heitbrink
(74) Attorney, Agent, or Firm — Greenblum & Bernstein, P.L.C.

(57) ABSTRACT

A process for producing a molded article includes the mixing step of mixing a plant material, water and a thermoplastic resin to obtain a molding material, and the injecting and molding step of injecting the molding material in a molding die and molding the molding material with the molding die to obtain the molded article. In the mixing step, a material containing lignin in an amount of 10% by mass or more when the total amount of the plant material is taken as 100% by mass is used as the plant material, the thermoplastic resin is mixed in an amount of 5 to 50% by mass and the plant material is mixed in an amount of 50 to 95% by mass when the total amount of the thermoplastic resin and the plant material is taken as 100% by mass, water is mixed in an amount of 5 to 200% by mass based on 100% by mass of the plant material, and the plant material, water and the thermoplastic resin are nixed while thernofusing the thermoplastic resin.

5 Claims, No Drawings

PROCESS FOR INJECTION MOLDING RESIN WITH PLANT MATERIAL

TECHNICAL FIELD

The present invention relates to a molded article containing a plant material and a thermoplastic resin and obtained by injection molding, and a process for producing the same.

BACKGROUND ART

Conventionally, various molded articles have been known as a molded article containing a plant material and a thermoplastic resin. By mixing the plant material along with the thermoplastic resin, excellent bending resistance, impact resistance and deformation resistance can be given to the molded article.

In order to produce the molded article which is more excellent in the above-described various performances, it is considered better to mix a large amount of the plant material. Generally, an extrusion forming method and a press forming method have been used as the method for producing the molded article containing a large amount of the plant material. Where the content of the plant material is increased, the fluidity of a molding material lowers, but with these methods, the molding material exhibiting a low fluidity can be formed. The molded articles obtained with the extrusion forming method and the press forming method, are low in degree of freedom of configuration. With an injection molding method, molded articles, each exhibiting a high degree of freedom of configuration, can be obtained, but it is very difficult to inject a molding material containing a large amount of plant material, and exhibiting a low fluidity.

Molded articles, each containing a plant material and a thermoplastic resin and being formed with injection molding, have been also proposed (see Patent Document 1, for example). Patent Document 1 discloses that by relatively decreasing the content of the plant material, the injection molding becomes possible. Patent Document 1 discloses that the molding material containing a plant material in an amount of 10 to 30% by mass when the total amount of the molding material is taken as 100% by mass can be subjected to injection molding, and that the molding material which contains a plant material in an amount of 60% by mass when the total amount of the molding material is taken as 100% by mass cannot be subjected to injection molding. Thus, conventionally, molded articles, each containing a large amount of the plant material and exhibiting high degree of freedom of configuration, have not been able to be obtained.

And, in recent years, in consideration of environmental problems, such as increasing of emission amount of carbon dioxide, etc., it has been proposed to give more excellent biodegradability to molded articles, using polylactic acid resin as the thermoplastic resin. However, polylactic acid resin is expensive. Therefore, if the mixing ratio of polylactic acid resin is increased, the production costs of the molded articles increase. In addition, polylactic acid resin is inferior in heat resistance so that in order to give heat resistance to the molded articles containing polylactic acid resin, a crystallizing step such as an annealing treatment, etc. is needed. Therefore, where polylactic acid resin is used as the thermoplastic resin, there is exhibited the problem that the production costs of the molded articles become very expensive.

Patent Document 1: Patent application laid-open No. 2005-105245

DISCLOSURE OF THE INVENTION

Problem to be Solved with the Invention

The present invention has been made in consideration of the above-described circumstances, and has an object of providing a molded article containing a large amount of a plant material, exhibiting a high degree of freedom of configuration, and produced at low costs, and a process for producing the same.

Means for Solving the Problems

The molded article in accordance with the present invention, which solves the above-described problems, is characterized in that the molded article contains a plant material and a thermoplastic resin, and is obtained by injection molding, when the total amount of the above-described thermoplastic resin and the above-described plant material is taken as 100% by mass, the above-described thermoplastic resin is contained in an amount of 5 to 50% by mass and the above-described plant material is contained in an amount of 50 to 95% by mass, and when the total amount of the above-described plant material is taken as 100% by mass, the above-described plant material contains lignin in an amount of 10% by mass or more, and has a particle diameter of 24 through 48 mesh.

It is preferable that the molded article in accordance with the present invention is provided with one of the following (1) through (3). It is more preferable that the molded article is provided with a plurality of the following (1) through (3).

(1) The above-described plant material contains lignin in an amount of 20% by mass or more when the total amount of the above-described plant material is taken as 100% by mass.

(2) The above-described plant material is a core material of kenaf.

(3) The above-described thermoplastic resin is polylactic acid resin.

The process for producing a molded article in accordance with the present invention, which solves the above-described problem, is characterized in that the process includes a mixing step of mixing a plant material, water and a thermoplastic resin to obtain a molding material, and an injection molding step of injecting the molding material in a molding die and molding the molding material with the molding die to obtain the molded article, and in the above-described mixing step, when the total amount of the above-described plant material is taken as 100% by mass, a material containing lignin in an amount of 10% by mass or more, and having a particle diameter of 24 through 48 mesh, is used as the above-described plant material, and when the total amount of the above-described thermoplastic resin and the above-described plant material is taken as 100% by mass, the above-described thermoplastic resin is mixed in an amount of 5 to 50% by mass and the above-described plant material is mixed in an amount of 50 to 95% by mass, the above-described water is mixed in an amount of 5 to 200% by mass based on 100% by mass of the above-described plant material, and the above-described plant material, the above-described water and the above-described thermoplastic resin are mixed while thermofusing the thermoplastic resin.

It is preferable that the process for producing a molded article in accordance with the present invention is provided with one of the following (4) through (7). It is more preferable that the process for producing a molded article in accordance with the present invention is provided with a plurality of the following (4) through (7).

(4) In the above-described mixing step, when the total amount of the above-described plant material is taken as 100% by mass, a material containing lignin in an amount of 20% by mass or more is used as the above-described plant material.
(5) In the above-described mixing step, a core material of kenaf is used as the above-described plant material.
(6) In the above-described mixing step, polylactic acid resin is used as the above-described thermoplastic resin.
(7) In the above-described mixing step, the above-described water is mixed in an amount of 50 through 100% by mass based on 100% by mass of the above-described plant material.

Operational Effect of the Invention

The molded article in accordance with the present invention contains a thermoplastic resin in an amount of 5 to 50% by mass and the above-described plant material is contained in an amount of 50 to 95% by mass when the total amount of the thermoplastic resin and the above-described plant material is taken as 100% by mass. Therefore, excellent biodegradability due to the plant material, excellent bending resistance, excellent impact resistance, excellent deformation resistance, etc. are given to the molded article in accordance with the present invention.

The molded article in accordance with the present invention is formed by injection molding so as to exhibit a high degree of freedom of configuration. In other words, the molded article in accordance with the present invention can have various configurations. The reasons why the molded article in accordance with the present invention can be formed by injection molding though a large amount of the plant material is contained have not been cleared, but it is considered that one of the reasons is a large amount of lignin being contained in the plant material.

And, though the content of the thermoplastic resin is small, the molded article in accordance with the present invention exhibits sufficient impact resistance and sufficient bending resistance. This is considered to be caused by lignin contained in the plant material in a large amount acting as an adhesive agent.

Where the molded article in accordance with the present invention is provided with the above-described (1), it is more excellent in degree of freedom of configuration, because the plant material contains a very large amount of lignin. This is caused by the injection molding becoming much easier by virtue of a large amount of lignin contained in the plant material. In addition, the adhesion effect due to lignin becomes higher so that more excellent impact resistance and bending resistance are exhibited.

Where the molded article in accordance with the present invention is provided with the above-described (2), there are exhibited advantages that the molded article can be formed at low costs, and can cope with environmental problems. Namely, kenaf is an annual plant belonging to the mallow family, and grows rapidly. Therefore, in recent years, kenaf has been noted as a raw material of papers, etc., which is substituted for wood. Kenaf fibers as a raw material of papers, etc. are formed of bast of kenaf. On the other hand, a core material of kenaf is a part that has been discarded. Therefore by using the core material of kenaf as the plant material, the material costs of the molded articles can be reduced, and the manufacturing costs of the molded articles can be reduced.

Where the molded article in accordance with the present invention is provided with the above-described (3), excellent biodegradability can be given to the molded article. Since excellent biodegradability can be given to the molded article, the increment of the emissions of carbon dioxide, etc. can be restrained so as to be able to cope with the environmental problems. And, the plant material contained in the molded article of the present invention in a large amount is excellent in heat resistance. Therefore, the molded article of the present invention exhibits sufficient heat resistance even where polylactic acid resin is selected as the thermoplastic resin. In addition, polylactic acid resin is excellent in bonding properties to cellulose that is contained in the plant material. Consequently, the molded article containing polylactic acid resin as the thermoplastic resin also has the advantage of excellent rigidity.

With the process for producing the molded article in accordance with the present invention, in the mixing step, the plant material, water and the thermoplastic resin are mixed together. At this time, the mixing ratio of water is determined to 5 through 200% by mass based on 100% by mass of the plant material. By relatively increasing the mixing ratio of water to the plant material, the plant material absorbs water to increase the apparent density thereof. Consequently, the plant material is mixed with the thermoplastic resin homogeneously. Therefore, in the molded article obtained with the process of the present invention, the plant material and the thermoplastic resin are homogeneously arranged, thereby making the quality uniform.

And by using the material containing lignin in an amount of 10% by mass or more when the total amount of the plant material is taken as 100% by mass, as the plant material, and mixing the plant material, water and the thermoplastic resin while thermofusing the thermoplastic resin in the mixing step, the molding material excellent in fluidity, namely, the molding material capable of being subjected to injection molding, can be obtained with the process for producing the molded article in accordance with the present invention, though a large amount of the plant material is contained in the molding material.

The reasons therefor are not cleared, but it is considered to be caused by the plant material and the thermoplastic resin being mixed at an elevated temperature in the presence of water, and the material containing a large amount of lignin being used as the plant material. In accordance with the process of the present invention, the molded article containing a large amount of the plant material and formed by injection molding can be obtained.

Where the process for producing the molded article in accordance with the present invention is provided with the above-described (4), the molded article that is excellent in degree of freedom of configuration, and exhibits more excellent impact resistance and bending resistance can be obtained, similarly to the case of the above-described (1).

Where the process for producing the molded article in accordance with the present invention is provided with the above-described (5), there are advantages that the molded article can be produced at low costs, and the increment of emissions of carbon dioxide, etc. can be restrained so as to be able to cope with the environmental problems, similarly to the case of the above-described (2).

Where the process for producing the molded article in accordance with the present invention is provided with the above-described (6), the molded article to which excellent biodegradability is given can be produced, and the molded article excellent in bending resistance and impact resistance can be produced, similarly to the case of the above-described (3).

Since the process for producing the molded article in accordance with the present invention uses the plant material having a particle diameter of 24 through 48 mesh, the molded article that is more excellent in bending resistance, impact resistance and deformation resistance can be produced. The plant material with a particle diameter of 24 through 48 mesh is sufficiently small in surface area thereof. Therefore, where the plant material with these sizes is used, the adhesion components such as the thermoplastic resin and lignin homogeneously adhere to surfaces of the plant material. And, since the surface area of the plant material is sufficiently large, the contacting portions between the plant materials increase so that the plant materials securely adhere to each other. It is considered that with the process for producing the molded article in accordance with the present invention, the molded article that is more excellent in bending resistance, impact resistance, and deformation resistance can be produced by virtue of the cooperation of these factors.

In this case, 24 mesh corresponds to the nominal size 710 (μm) of a standard sieve in accordance with JIS Z 8801. 48 mesh corresponds to the nominal size 300 (μm) of a standard sieve in accordance with JIS Z 8801. The particle diameter of 24 through 48 mesh means the diameter of particles that pass through the sieve of 24 mesh but do not pass through the sieve of 48 mesh.

Where the process for producing the molded article in accordance with the present invention is provided with the above-described (7), the water content relative to the plant material increases. Therefore, with the process for producing the molded article in accordance with the present invention, in the mixing step, the plant material and the thermoplastic resin are mixed together homogeneously, and the molded article that is excellent in fluidity can be obtained. And, since the water content relative to the plant material is not too large, water contained in the molding material sufficiently vaporizes in the mixing step and the injection molding step. Therefore, such a step as to vaporize the water contained in the molding material is not additionally needed.

BEST MODE FOR CARRYING OUT THE INVENTION

The plant material adapted to be used in the molded article and the process for producing the same in accordance with the present invention contains lignin in an amount of 10% by mass or more when the total amount of the plant material is taken as 100% by mass. Hereinafter, the lignin content (% by mass) when the total amount of the plant material is taken as 100% by mass will be simply referred to as the lignin content. Examples of the plant material of which the lignin content is 10% by mass or more include a core material, an epidermal material and branches, etc. of trees such as Japanese-cedar, Japanese-cypress, etc. The lignin content of the core material, the epidermal material and the branches, etc. of trees which have not been subjected to pulping is 20% by mass or more, so that these materials are preferably used. And among grasses, materials which have not been formed into fibers (such as a core material of kenaf) also have the lignin content of 20% by mass or more so as to be preferably used. For reference, the lignin content of the core material of kenaf is about 23% by mass.

Examples of the thermoplastic resin used in the molded article and the process for producing the same in accordance with the present invention include acrylic resin, ABS resin, polylactic acid resin, polyethylene, polypropylene, polyethylene terephthalate, etc. These materials may be used solely, or two kinds or more of these materials may be arbitrarily used in combination. In the process in accordance with the present invention, it is preferable to use a thermoplastic resin in the solid state and with a small size (such as granular shape or powdery shape). Where the thermoplastic resin in the solid state and with a small size is used, the plant material and the thermoplastic resin are mixed together very homogeneously in the mixing step.

The molded article in accordance with the present invention is an article containing a large amount of the plant material and produced by injection molding. And with the process for producing the molded article in accordance with the present invention, the molded article can be obtained by injection molding though a large amount of the plant material is contained. In the molded article and the process for producing the same in accordance with the present invention, the molded article (or the molding material) contains a thermoplastic resin in an amount of 5 to 50% by mass and a plant material in an amount of 50 to 95% by mass, when the total amount of the thermoplastic resin and the plant material is taken as 100% by mass. Where the molded article in accordance with the present invention consists of the plant material and the thermoplastic material, the molded article of the present invention contains the plant material in an amount of 50 to 95% by mass and the thermoplastic resin in an amount of 50 to 5% by mass. Similarly, in the process in accordance with the present invention, where the molding material consists of the plant material, the thermoplastic resin and water, the obtained molded article contains the plant material in an amount of 50 to 95% by mass and the thermoplastic resin in an amount of 50 to 5% by mass.

In the molded article and the process for producing the same in accordance with the present invention, it is preferable that the plant material is contained in an amount of 60% by mass or more, and more preferably 70% by mass or more, based on 100% by mass of the thermoplastic resin. This serves to improve the bending resistance, the impact resistance and the deformation resistance.

In the present invention, the injection molding includes an injection pressing molding method, etc. other than a normal injection molding method.

EMBODIMENT

Hereinafter, the molded article and the process for producing the same in accordance with the present invention will be explained based on various examples.

Embodiment 1

In the process for producing a molded article of Embodiment 1, a core material of kenaf was used as the plant material, and polylactic acid resin (PLA) was used as the thermoplastic resin. Hereinafter, the process for producing a molded article of Embodiment 1 will be explained.

(1) Mixing Step

A core material of kenaf was pulverized and passed through a sieve of 24 mesh. The core material of kenaf, which had been passed through the sieve of 24 mesh, was passed through a sieve of 48 mesh. The core material of kenaf, which had been passed through the sieve of 24 mesh, but had not been passed through the sieve 48 mesh, was used as the plant material. This plant material, a granular thermoplastic resin (PLA with an average particle diameter of 3.0 mm), and water were inputted in a mixing and fusing device, and stirred therein, thereby mixing the plant material, the thermoplastic resin and water together. The plant material was mixed in an amount of 60% by mass when the total amount of the plant material and the thermoplastic resin (hereinafter will be referred to as "total amount of plant and resin") was taken as 100% by mass. The thermoplastic resin was mixed in an amount of 40% by mass when the total amount of plant and resin was taken as 100% by mass. Water was mixed in an amount of 50% by mass based on 100% by mass of the plant material.

A device of the same kind as that of the device disclosed in WO-2004-076044 was used as the mixing and fusing device. First, the plant material, the thermoplastic resin and water were inputted in a stirring chamber of the mixing and fusing device. Next, moving blades of the mixing and fusing device were rotated to mix the plant material, the thermoplastic resin and water inputted in the stirring chamber. The rotating speed of the moving blades at leading-end thereof was 30 m/s, and the time required for stirring and mixing was 70 seconds. The plant material, the thermoplastic resin and water were stirred and mixed at elevated speeds due to the high speed rotation of the moving blades. At this time, the plant resin material, the thermoplastic resin and water in the stirring chamber generated heat rapidly due to the shearing, friction and compression with the moving blades. The thermoplastic resin fused due to the generated heat to disperse generally homogeneously on a surface of the plant material. Water vaporized with this heat. In this mixing step, a primary material in which the plant material and the thermoplastic resin were generally homogeneously mixed was obtained.

By pelletizing the obtained primary material with a twin-screw extruder, a secondary material was obtained. A twin-screw extruder manufactured by PLABOR co., Ltd., and having a screw bore diameter Ø of 40 mm, and a screw length (L/D) of 32 was used as the twin-screw extruder. The pelletizing temperature was 190° C. The obtained secondary material was dried at 100° C. for 24 hours, and a molding material was obtained.

(2) Injection Molding Step

The molding material obtained in the mixing step was inputted in a injection molding machine, and heated and fused at 190° C. Next, the fused molding material was injected to a molding die of which the temperature was raised to 60° C. with this injecting molding machine, and molded with the molding die. The injection molding machine M100C-DM manufactured by MEIKI CO., LTD. was used.

With the above-described mixing step and injection molding step, the molded article of Embodiment 1 was obtained.

Comparative Example 1

The process for producing a molded article of Comparative Example 1 is similar to that of Embodiment 1 except for the particle diameter of the plant material. In the process for producing the molded article of Comparative Example 1, the particle diameter of the plant material was 100 mesh. 100 mesh corresponds to the nominal size 150 (μm) of a standard sieve in accordance with JIS Z 8801. The plant material with the particle diameter of 100 mesh means the plant material passed through a sieve of 100 mesh. The molded article of Comparative Example 1 was obtained with the process for producing the molded article of Comparative Example 1.

Comparative Example 2

The process for producing a molded article of Comparative Example 2 is similar to that of Embodiment 1 except for the particle diameter of the plant material. In the process for producing the molded article of Comparative Example 2, the particle diameter of the plant material ranged from 24 to 16 mesh. 16 mesh corresponds to the nominal size 1.00 (mm) of a standard sieve in accordance with JIS Z 8801. The molded article of Comparative Example 2 was obtained with the process for producing the molded article of Comparative Example 2.

Embodiment 2

The process for producing a molded article of Embodiment 2 is similar to that of Embodiment 1 except for the mixing ratio of the plant material, the thermoplastic resin and water. More specifically, the plant material was mixed in an amount of 70% by mass when the total amount of plant and resin was taken as 100% by mass. The thermoplastic resin was mixed in an amount of 30% by mass when the total amount of plant and resin was taken as 100% by mass. Water was mixed in an amount of 50% by mass based on 100% by mass of the plant material. The molded article of Embodiment 2 was obtained with the process for producing the molded article of Embodiment 2.

Embodiment 3

The process for producing a molded article of Embodiment 3 is similar to that of Embodiment 1 except for the mixing ratio of the plant material, the thermoplastic resin and water. More specifically, the plant material was mixed in amount of 80% by mass when the total amount of plant and resin was taken as 100% by mass. The thermoplastic resin was mixed in an amount of 20% by mass when the total amount of plant and resin was taken as 100% by mass. Water was mixed in an amount of 50% by mass based on 100% by mass of the plant material. The molded article of Embodiment 3 was obtained with the process for producing the molded article of Embodiment 3.

Embodiment 4

The process for producing a molded article of Embodiment 4 is similar to that of Embodiment 1 except that polypropylene (PP) was used as the thermoplastic resin. The molded article of Embodiment 4 was obtained with the process for producing the molded article of Embodiment 4.

Comparative Example 3

The process for producing a molded article of Comparative example 3 is similar to that of Embodiment 1 except for a tree bark of Japanese-cypress being used as the plant material, PP being used as the thermoplastic resin, and the mixing ratio of the plant material, the thermoplastic resin and water. More specifically, the plant material was mixed in an amount of 80% by mass when the total amount of plant and resin was taken as 100% by mass. The thermoplastic resin was mixed in an amount of 20% by mass when the total amount of plant and resin was taken as 100% by mass. Water was mixed in an amount of 50% by mass based on 100% by mass of the plant material. The particle diameter of the plant material raged from 24 mesh through 16 mesh. The molded article of Comparative example 3 was obtained with the process for producing the molded article of Comparative example 3.

Comparative Example 4

In the process for producing a molded article of Comparative example 4, fiber of kenaf was used as the plant material. In the process for producing a molded article of Comparative example 4, the plant material was mixed in an amount of 10% by mass when the total amount of plant and resin was taken as 100% by mass. The thermoplastic resin was mixed in an amount of 90% by mass when the total amount of plant and resin was taken as 100% by mass. Water was not mixed. The average fiber length of the plant material was 5 mm. The plant material and the thermoplastic resin were inputted in an extruder, a pellet-shaped molding material was obtained. The obtained molding material was subjected to injection molding, similarly to Embodiment 1, to obtain a molding precursor. The obtained molding precursor was subjected to a crystallization treatment at 100° C. for 1 hour to obtain a molded article. With the process for producing a molded article of Comparative example 4, a molded article of Comparative example 4 was obtained. The lignin content of the fiber of kenaf in Comparative example 4 and later-describing Comparative examples 5 through 6 was about 2% by mass.

Comparative Example 5

The process for producing a molded article of Comparative example 5 is similar to that of Comparative example 4 except for the mixing ratio of the plant material and the thermoplastic resin. More specifically, the plant material was mixed in an amount of 20% by mass when the total amount of plant and resin was taken as 100% by mass. The thermoplastic resin was mixed in an amount of 80% by mass when the total amount of plant and resin was taken as 100% by mass. With the process for producing a molded article of Comparative example 5, a molded article of Comparative example 5 was obtained.

Comparative Example 6

The process for producing a molded article of Comparative example 6 is similar to that of Comparative example 4 except for the mixing ratio of the plant material and the thermoplastic resin. More specifically, the plant material was mixed in an amount of 30% by mass when the total amount of plant and resin was taken as 100% by mass. The thermoplastic resin was mixed in an amount of 70% by mass when the total amount of plant and resin was taken as 100% by mass. With the process for producing a molded article of Comparative example 6, a molded article of Comparative example 6 was obtained.

Comparative Example 7

The process for producing a molded article of Comparative example 7 is similar to that of Comparative example 4 except that the plant material was not mixed. With the process for producing a molded article of Comparative example 7, a molded article of Comparative example 7 was obtained.

(Evaluation Test on Physical Properties of Molded Article)

The flexural modulus, the izod impact strength and the coefficient of linear expansion of the molded articles of Embodiments 1 through 4 and Comparative examples 1 through 7 were measured.

The flexural modulus (GPa) was measured (23° C.) in accordance with JIS K7171, and also measured at 80° C. It was evaluated that as the flexural modulus increased, the bending resistance was enhanced.

The izod impact strength (KJ/m$^2$) was measured in accordance with JIS K7110. It was evaluated that as the izod impact strength increased, the impact resistance was enhanced.

The coefficient of linear expansion (/° C.) was measured in accordance with JIS K7197. With respect to the molded articles of Embodiments 1, 2, 3, Comparative example 3, the coefficient of linear expansion thereof was calculated in the temperature range of 0° C. to 110° C. With respect to the molded articles of Comparative examples 4 through 7, the coefficient of linear expansion thereof was calculated based on the data obtained in the temperature range of 0° C. to 60° C. This is caused by polylactic acid resin contained in the molded articles of Comparative examples 4 through 7 in a large amount having a glass transition point of 58° C., and the dimensions thereof greatly varying when the temperature exceeds 60° C. It was evaluated that as the coefficient of linear expansion was decreased, the deformation resistance was enhanced. The flexural modulus, the izod impact strength and the coefficient of linear expansion of the molded articles of Embodiments 1 through 4 and Comparative examples 1 through 7 are shown in Table 1. In Table 1, the mixing ratio of the plant material and the mixing ratio of the thermoplastic resin respectively mean the mixing ratio when the total amount of plant and resin is taken as 100% by mass. The mixing ratio of water means the mixing ratio based on 100% by mass of the plant material.

TABLE 1

|  |  | Embodiment | | | | Comparative example | | | | | | |
|---|---|---|---|---|---|---|---|---|---|---|---|---|
|  |  | 1 | 2 | 3 | 4 | 1 | 2 | 3 | 4 | 5 | 6 | 7 |
| Mixing ratio of plant material (% by mass) | Core material of kenaf | 60 | 70 | 80 | 60 | 60 | 60 | — | — | — | — | — |
|  | Fiber of kenaf | — | — | — | — | — | — | — | 10 | 20 | 30 | — |
|  | tree bark of Japanese-cypress | — | — | — | — | — | — | 80 | — | — | — | — |
| Mixing ratio of thermoplastic resin (% by mass) | PLA | 40 | 30 | 20 | — | 40 | 40 | — | 90 | 80 | 70 | 100 |
|  | PP | — | — | — | 40 | — | — | 20 | — | — | — | — |
| Mixing ratio of water (% by mass) |  | 50 | 50 | 50 | 50 | 50 | 50 | 50 | — | — | — | — |
| Particle diameter of plant material (mesh) |  | 48~24 | 48~24 | 48~24 | 48~24 | 100 | 24~16 | 24~16 | — | — | — | — |
| Fiber length of plant material (mm) |  | — | — | — | — | — | — | — | 5 | 5 | 5 | — |
| Flexural modulus at 23°. (GPa) |  | 12 | 13.2 | 15.1 | 6.1 | 10 | 9.4 | 7.8 | 3.7 | 4.2 | 5 | 3.5 |
| Flexural modulus at 80°. (GPa) |  | 2.6 | 2.7 | 3.2 | 1.8 | 2.2 | 1.8 | 2.8 | 0.4 | 0.7 | 0.9 | 0.4 |
| Izod impact strength at 23°. (KJ/m$^2$) |  | 4.7 | 4.5 | 2.8 | 3.9 | 3.1 | 2.7 | 5 | 2.5 | 2.5 | 2.8 | 2.5 |
| Coefficient of linear expansion (×10$^{-5}$/.) |  | 2.2 | 1.8 | 1.3 | — | — | — | — | 7.5 | 7.3 | 6.8 | 7.5 |

As shown in Table 1, the molded article of each embodiment exhibits a greater flexural modulus, a greater izod impact strength and a smaller coefficient of liner expansion, as compared with the molded article of each comparative example. Therefore, it is apparent therefrom that the molded article in accordance with the present invention is excellent in bending resistance, impact resistance, and deformation resistance.

The invention claimed is:

1. A process for producing a molded article, characterized in that the process includes the steps of mixing a plant material, water and a thermoplastic resin to obtain a molding material, and injecting said molding material in a molding die and molding said molding material with said molding die to obtain the molded article, in said mixing step,
said plant material containing lignin in an amount of 10% by mass or more when the total amount of said plant material is taken as 100% by mass, and said plant material having a particle diameter of 24 through 48 mesh, is used as said plant material,
said thermoplastic resin is mixed in an amount of 5 to 50% by mass, and said plant material is mixed in an amount of 50 to 95% by mass when the total amount of said thermoplastic resin and said plant material is taken as 100% by mass,
said water is mixed in an amount of 5 to 200% by mass based on 100% by mass of said plant material, and
said plant material, said water and said thermoplastic resin are mixed while thermofusing said thermoplastic resin.

2. A process for producing a molded article as claimed in claim 1, wherein in said mixing step, a material containing lignin in an amount of 20% by mass or more when the total amount of said plant material is taken as 100% by mass is used as said plant material.

3. A process for producing a molded article as claimed in claim 1, wherein in said mixing step, a core material of kenaf is used as said plant material.

4. A process for producing a molded article as claimed in claim 1, wherein in
said mixing step, polylactic acid resin is used as said thermoplastic resin.

5. A process for producing a molded article as claimed in claim 1, wherein in said mixing step, said water is mixed in an amount of 50 through 100% by mass based on 100% by mass of said plant material.

* * * * *